US006941864B2

(12) United States Patent
Dick et al.

(10) Patent No.: US 6,941,864 B2
(45) Date of Patent: Sep. 13, 2005

(54) METHOD TO CONTROL OPTIMIZED CUTTING OF STOCK TO SATISFY A CUT LIST

(75) Inventors: Spencer B. Dick, Portland, OR (US); David Lee, Vancouver, WA (US); David A. Morgan, Portland, OR (US)

(73) Assignee: Precision Automation, Inc., Vancouver, WA (US)

(*) Notice: Subject to any disclaimer, the term of this patent is extended or adjusted under 35 U.S.C. 154(b) by 188 days.

(21) Appl. No.: 10/645,828

(22) Filed: Aug. 20, 2003

(65) Prior Publication Data

US 2004/0199283 A1 Oct. 7, 2004

Related U.S. Application Data

(60) Provisional application No. 60/405,067, filed on Aug. 20, 2002, provisional application No. 60/405,068, filed on Aug. 20, 2002, and provisional application No. 60/405,069, filed on Aug. 20, 2002.

(51) Int. Cl.$^7$ ............................. B41F 31/06; B26D 7/06
(52) U.S. Cl. ......................................... 101/483; 83/438
(58) Field of Search ....................... 101/483; 83/438, 83/471.1, 76.9, 241, 468.6, 468.7, 838; 700/171

(56) References Cited

U.S. PATENT DOCUMENTS

| | | | |
|---|---|---|---|
| 2,577,766 A | 12/1951 | Johnson et al. | 409/158 |
| 2,852,049 A | 9/1958 | Peterson | 83/438 |
| 3,170,736 A | 2/1965 | Wright | 384/215 |
| 3,566,239 A | 2/1971 | Taniguchi | 318/593 |
| 3,584,284 A | 6/1971 | Beach | 318/569 |
| 3,814,153 A | 6/1974 | Schmidt | 144/4.2 |
| 3,854,889 A | 12/1974 | Lemelson | 29/33 P |
| 4,221,974 A | 9/1980 | Mueller et al. | 250/559.4 |
| 4,260,001 A | 4/1981 | De Muynck | 144/367 |
| 4,358,166 A | 11/1982 | Antoine | 384/215 |
| 4,453,838 A | 6/1984 | Loizeau | 384/125 |
| 4,472,783 A | 9/1984 | Johnstone et al. | 700/182 |
| 4,596,172 A * | 6/1986 | Visser | 83/75.5 |
| 4,725,961 A | 2/1988 | Pearl | 700/171 |
| 4,874,996 A | 10/1989 | Rosenthal | 318/567 |
| 4,878,524 A | 11/1989 | Rosenthal et al. | 144/356 |
| 4,879,752 A * | 11/1989 | Aune et al. | 382/141 |
| 5,001,955 A | 3/1991 | Fujiwara | 83/488 |
| 5,054,938 A | 10/1991 | Ide | 384/117 |
| 5,197,172 A | 3/1993 | Takagi et al. | 29/33 P |
| 5,251,142 A | 10/1993 | Cramer | 700/171 |
| 5,266,878 A | 11/1993 | Makino et al. | 318/571 |
| 5,365,812 A | 11/1994 | Harnden | 83/34 |
| 5,418,729 A | 5/1995 | Holmes et al. | 700/167 |
| 5,444,635 A | 8/1995 | Blaine et al. | 700/171 |
| 5,460,070 A | 10/1995 | Buskness | 83/438 |
| 5,472,028 A | 12/1995 | Faulhaber | 144/357 |
| 5,489,155 A | 2/1996 | Ide | 384/117 |
| 5,524,514 A | 6/1996 | Hadaway et al. | 83/76.9 |
| 5,664,888 A | 9/1997 | Sabin | 384/10 |
| RE35,663 E | 11/1997 | Mori et al. | |
| 5,772,192 A | 6/1998 | Hoffmann | 269/37 |
| 5,797,685 A | 8/1998 | Jurik et al. | 384/215 |
| 5,798,929 A | 8/1998 | Stenzel et al. | 700/213 |
| 5,829,892 A | 11/1998 | Groves | 384/537 |
| 5,865,080 A | 2/1999 | Jackson | 83/74 |
| 5,933,353 A | 8/1999 | Abriam et al. | 700/182 |
| 5,938,344 A | 8/1999 | Sabin | 384/278 |

(Continued)

*Primary Examiner*—Andrew H. Hirshfeld
*Assistant Examiner*—Wasseem H. Hamdan
(74) *Attorney, Agent, or Firm*—Kolisch Hartwell, P.C.

(57) ABSTRACT

A method of processing material involves cutting pieces of material pursuant to a cut list and managing remaining salvage and defect pieces. A computer may be connected to a saw machine, and programmed to optimize cutting of stock to satisfy a cut list. An operator may input a cut list into the computer along with other parameters such as minimum salvage and defect lengths. A printer may be configured to automatically print labels for application to cut pieces.

10 Claims, 5 Drawing Sheets

U.S. PATENT DOCUMENTS

| | | | |
|---|---|---|---|
| 5,953,232 A | 9/1999 | Blaimschein | 700/171 |
| 5,960,104 A * | 9/1999 | Conners et al. | 382/141 |
| 5,964,536 A | 10/1999 | Kinoshita | 384/441 |
| 6,062,280 A * | 5/2000 | Newnes et al. | 144/357 |
| 6,144,895 A | 11/2000 | Govindaraj et al. | 700/181 |
| 6,263,773 B1 | 7/2001 | McAdoo et al. | 83/75.5 |
| 6,272,437 B1 | 8/2001 | Woods et al. | 702/35 |
| 6,379,048 B1 | 4/2002 | Brissette | 384/202 |
| 6,463,352 B1 | 10/2002 | Tadokoro et al. | 700/169 |
| 6,470,377 B1 | 10/2002 | Sevcik et al. | 709/201 |
| 6,510,361 B1 | 1/2003 | Govindaraj et al. | 700/180 |
| 6,520,228 B1 | 2/2003 | Kennedy et al. | 144/398 |
| 6,594,590 B2 * | 7/2003 | Woods et al. | 702/35 |
| 6,631,006 B2 | 10/2003 | Dick et al. | 356/625 |

* cited by examiner

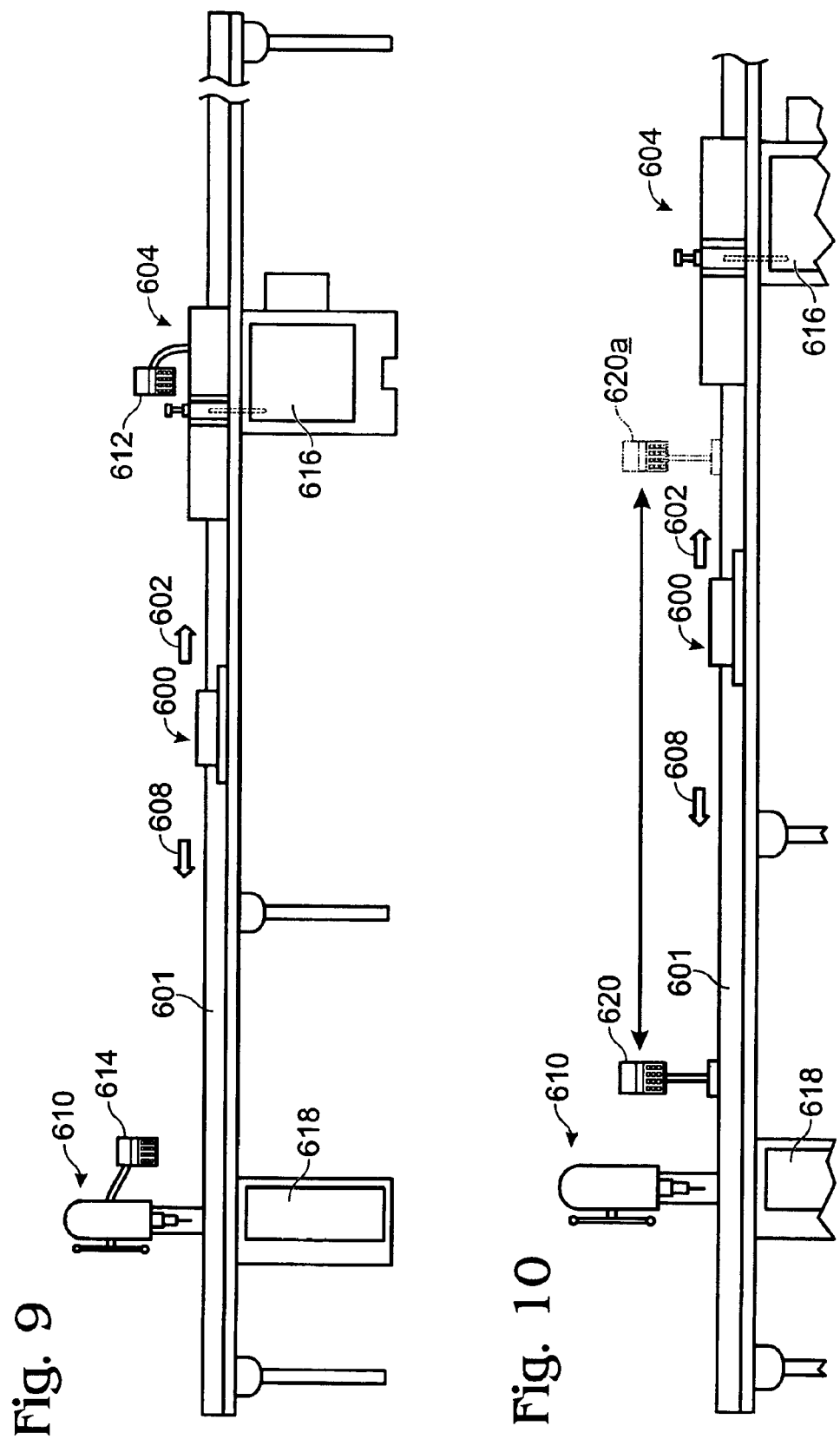

US 6,941,864 B2

METHOD TO CONTROL OPTIMIZED CUTTING OF STOCK TO SATISFY A CUT LIST

CROSS-REFERENCE TO RELATED APPLICATION

This application claims priority under 35 U.S.C. § 119 and applicable foreign and international law of U.S. Provisional Patent Applications Ser. Nos. 60/405,067 and 60/405,069 filed Aug. 20, 2002, each of which is hereby incorporated by reference in its entirety.

This application incorporates by reference in its entirety the following U.S. patent applications and patents: U.S. patent application Ser. No. 09/578,806 filed May 24, 2000 entitled "Automated Fence Control Coupling System"; U.S. patent application Ser. No. 09/861,231 filed May 17, 2001 entitled "System and Method of Marking Materials for Automated Processing"; U.S. patent application Ser. No. 10/104,492 filed Mar. 22, 2002 entitled "Automated Fence Control Coupling System"; U.S. Provisional Patent Application Ser. No. 60/405,068 filed Aug. 20, 2002 entitled "Process Management System and Method"; and U.S. Pat. Nos. 491,307; 2,315,458; 2,731,989; 2,740,437; 2,852,049; 3,994,484; 4,111,088; 4,434,693; 4,658,687; 4,791,757; 4,805,505; 4,901,992; 5,251,142; 5,443,554; 5,444,635; 5,460,070; 5,524,514; and 6,216,574.

FIELD OF THE INVENTION

The invention involves systems and methods of processing material, particularly relating to salvage and waste management.

BACKGROUND OF THE INVENTION

Automated saws are used extensively to cut materials for many different manufacturing applications. For example, saws may use a microprocessor to determine how to cut according to a user-supplied list of required dimensions, i.e., a cut list. The microprocessor controls movement of a pusher to position sites of cutting in a manner that optimizes utilization of raw material. For some applications, the operator may need to mark defects, such as knots, cracks, or discolored portions of a material, before cutting. The marked locations of defects allow the microprocessor to select cutting sites that exclude defects while making optimal use of the material according to the cut list requirements. However, a problem with existing systems is that after, cutting remaining pieces not conforming to the cut list are too often wasted.

SUMMARY OF THE INVENTION

The invention includes numerous aspects and permutations. For example, in a method of cutting material, a computer is connected to a saw machine. The computer is programmed to optimize cutting of stock to satisfy a cut list. Initially, a cut list is entered into the computer, along with a minimum salvage length (Smin), a minimum defect length (Dmin), and a maximum drop box length (DBmax). The length of a piece of material to be processed in input into the computer. Next, locations of the defects in the material are input into the computer. The computer then determines a cutting plan in which: (a) salvage pieces having length less than Smin are cut to length as DBmax or less, and (b) defect pieces having a length less than Dmin are cut to lengths of DBmax or less; except if adjacent salvage and defect pieces have a combined length greater than Dmin then the adjacent pieces are not cut to DBmax or less regardless of their individual length.

BRIEF DESCRIPTION OF THE DRAWINGS

FIGS. 9 and 10 show side views manufacturing assemblies configured for double ended processing.

DETAILED DESCRIPTION OF EXAMPLES OF THE INVENTION

Figure 1:
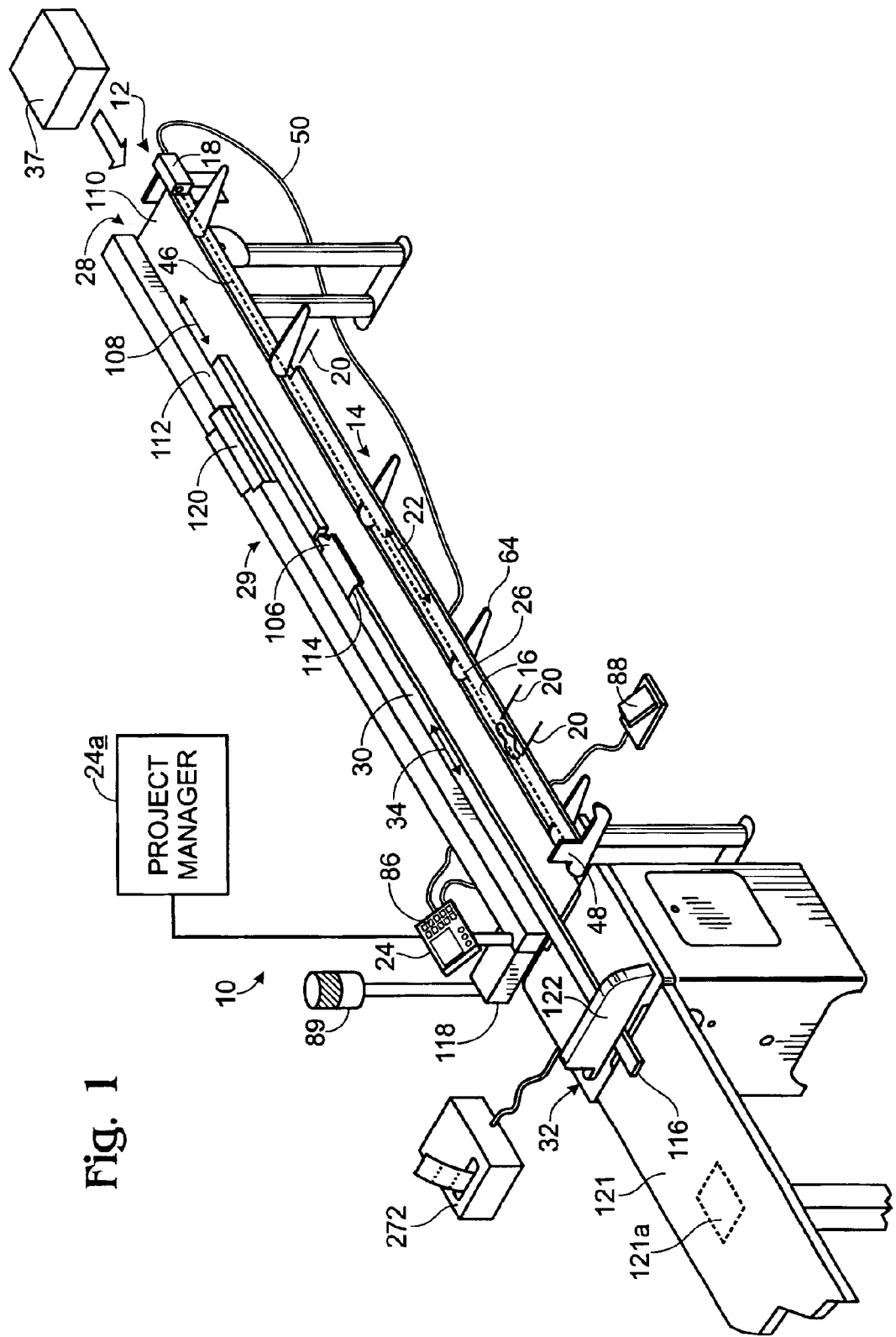
FIG. 1 is a view of an automated processing system including a virtual marking assembly, in accordance with aspects of the invention.

An example of an automated processing system constructed in accordance with the present invention is shown generally at 10 in FIG. 1. System 10 includes a marking assembly 12 positioned along a front portion of the system. Marking assembly 12 includes a marking station 14 to orient an article or material 16 relative to an optical measuring device 18. The article may be a wood product, metal, plastic, ceramic, and/or the like. The article may have any suitable shape and size, and may be elongate to define a long axis, which also may be a processing axis.

Feature locations 20 along a processing axis 22 of material 16 may be input by a user to the optical measuring device 18, which communicates the feature locations to a controller 24. Another computer 24a may be used remotely from controller 24 to store, edit, combine, or modify cut lists prior to downloading one or more cut lists to controller 24. Marking assembly 12 allows a user to virtually mark feature locations 20 of material 16 along processing axis 22 of the material. A "virtual mark" means a noted location on a material relative to a registration point such as an end of the material or an axis, without requiring an actual physical mark on the material.

Optical measuring device 18 may provide data input for processing. The optical measuring device may send a light beam along optical path 26. As described in more detail below, this path may be altered for at least a portion of the light beam by placing an object into the light beam at a location corresponding to a perimeter region of feature location 20. Alternatively, the object may be placed at a selected location that inputs data about other structural aspects of the material or about nonstructural aspects of material processing. Controller 24 may use one or more structural aspects of the material, such as feature locations 20 and/or overall length, among others, to determine cutting sites. Structural aspects may include dimensions, defect locations, grade of material, etc. One or more structural aspects may be input optically and/or with another user interface.

Processing station 28 may be configured to process the material automatically based on the optically input data. Material processing, as used herein, may include any structural alteration of an article (a material). The structural alteration may include removing or separating a portion of the article (such as by cutting, boring, punching, routing, mortising, sanding, drilling, shearing, etc.), adding another component (such as a fastener, a colorant, a sealing agent, a connected component, etc.), forming a joint (such as by tenoning), reshaping the article (such as by stamping, compression, bending, etc.), and/or altering the strength of the article (such as by heating, electromagnetic radiation exposure, radiation treatment, etc.), among others.

Station 28 may include a positioner assembly 29, which may position previously-marked material 30, relative to a material processing device, such as a saw 32. Positioned material 30 may be processed at one or more discrete positions along processing axis 34 of material 30 by saw 32. Material processing may be based on virtually-marked feature locations 20 or other processing data supplied by the user, by deflecting a light beam, as described below. Material processing also may be in accordance with a processing list, such as a cut list, which may be stored in or otherwise accessible to controller 24.

In some embodiments, a material feeding or positioning device 37, such as a roll feeder, may be used to feed material to a material processing device, such as a saw, in processing station 28. Alternatively, a pusher mechanism may be employed to engage an end of the material and push the material relative to the processing station, particularly relative to a material processing device of the processing station. Movement of a material positioning device (and/or a material processing device) along a line defines a processing line for in-line processing of an article. Accordingly, an article may be processed at one position or a plurality of discrete positions arrayed parallel to the processing line.

Figure 2:
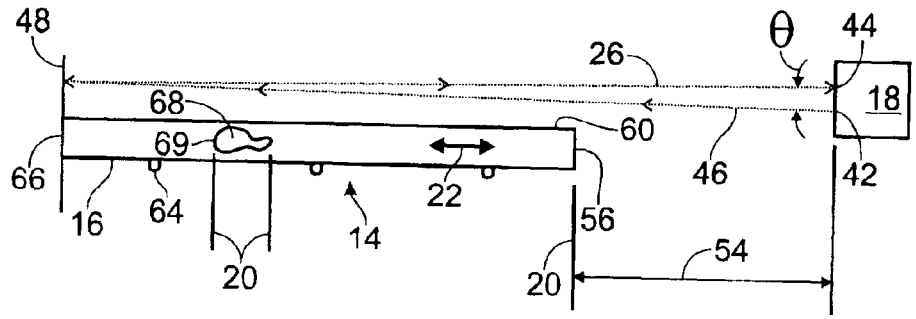
FIG. 2 is a schematic side elevation view of the virtual marking assembly of FIG. 1 showing a default optical path.

As shown schematically in FIG. 2, optical measuring device 18 includes a light source 42 and a light detector 44. Light source 42 sends or transmits a light beam 46, produced, for example, by a continuous or pulsed laser, along default optical path 26 to reflector 48, which reflects the light beam back to detector 44. Reflector 48 is an optional component of marking station 12 that provides a default optical path when the user has not interrupted optical path 26. Reflector 48 may be useful for calibrating optical measuring device 18 and to assist in positioning and measuring material 16, as described more fully below.

Processing data may be created by optical measuring device 18 according to the position at which light beam 46 is deflected manually. The processing data created may be analog and/or digital data. Deflection of a light beam, as used herein, is any deviation produced in at least a portion of the light beam away from a particular direction of travel, generally along a line. Deflection of the light beam may be produced by any suitable optical mechanism, including reflection, refraction, diffraction, scattering, and/or the like.

Detector 44 receives light from light beam 46 and detects any property of the light that allows device 18 to measure the position at which the light beam was deflected. For example, the detector may measure the length of optical path 26. In some embodiments, detector 44 may provide measurement of a time-of-flight of light from light beam 46 along optical path 26 by signaling light detection to a clock. The clock may measure the time-of-flight between light transmission and light detection and thus may provide a distance measurement or a related light parameter to be sent to controller 24 through any suitable means such as communications link 50 of FIG. 1. Rather than a time-of-flight measurement, any other property of light from light beam 46 may be measured to determine distance, such as angle of deflection for triangulation (see FIG. 6), or a phase shift using an interferometer, among others. Suitable optical measuring devices for use in the present invention are available from Leica Geosystems of Herrbrugg, Switzerland, under the name DISTO or from Hilti Corporation of Tulsa, Okla., under the names PD10 or PD20.

As shown in FIGS. 1 and 2, processing axis 22 of material 16 may be positioned substantially parallel to optical path 26, or a portion thereof, as processing data is input by deflection of the light beam. The light beam may be sent from light source 42, at a distance 54 from distal end 56 of wood product 16. Light beam 46 may travel along optical path 26 in a spaced relation from surface 60, for example, about 2 inches above surface 60. As shown in FIG. 2, surface 60 of material 16 may be substantially parallel to optical path 26, or a data input line thereof, and may be a top surface or a side surface of material 16. Optical path 26 also may be disposed below a bottom surface of material 16 and visualized with an appropriately-positioned mirror or mirrors.

The long axis and/or processing axis of material 16 may be oriented at least substantially parallel to optical path 26 in marking station 14, using an appropriate supporting structure such as brackets 64. Reflector 48 may act to define the default optical path 26. A proximal end 66 of material 16 may abut reflector 48. Proximal end 66 may be marked optically by deflection of the light beam by reflector 48, or may be manually marked by altering optical path 26, as described below, without the use of reflector 48.

Figure 3:
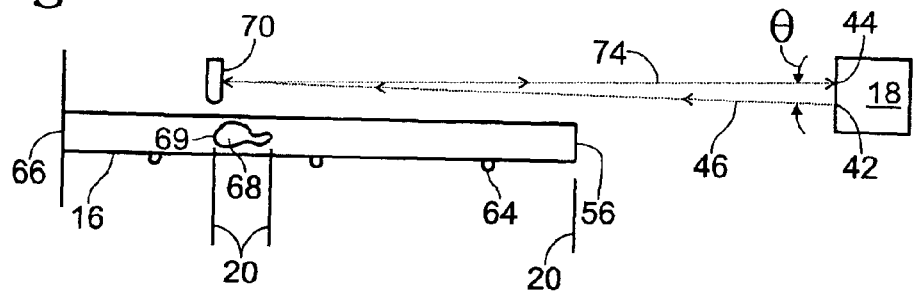
FIG. 3 is a schematic side elevation view of the marking assembly of FIG. 2 with an object marking a proximal boundary of a feature location by creating a new optical path.
Figure 4:
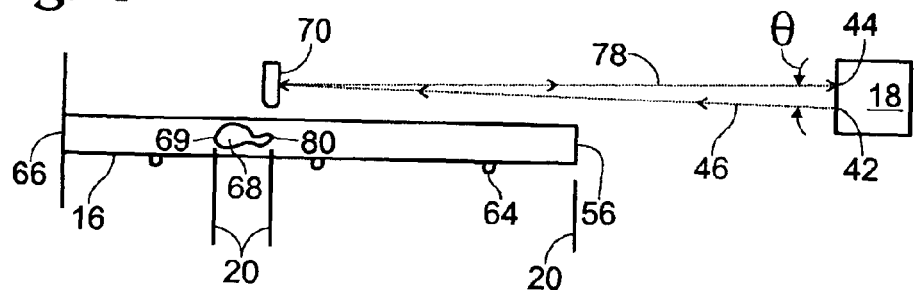
FIG. 4 is a schematic side elevation view of the marking assembly of FIG. 2 with an object marking a distal boundary of a feature location by creating a new optical path.

FIGS. 3–4 show schematically how optical path 26, for at least a portion of the light beam, may be altered by an object marking feature locations 20 of feature 68 in material 16. Feature 68 may be any aspect of material 16 between proximal end 66 and distal end 56 that may affect processing of material 16. For example, when material 16 is a wood product, a feature 68 may be a defect such as a knot, crack, recess, discolored portion, or uneven surface aberration. Features also may include proximal end 66 and distal end 56 of material 16. In some cases, a feature 68 may include any structural aspect of material 16 that influences subsequent processing of the material. With a wood product as material 16, feature location 20 typically defines a beginning or boundary location of a clear portion of the wood product that is defect-free.

As shown in FIG. 3, proximal end 69 of defect 68 may be marked by manually placing an object 70 in the light beam. The term manual, as used herein, means employing human rather than mechanical energy, that is, not automatic. Accordingly, object 70 may be any user-controlled object capable of deflecting some or all of light beam 46 to detector 44 from a position within optical path 26. Since many objects can deflect light, the choices for object 70 are numerous. For example, object 70 may be provided by a portion of the operator's body, such as a hand, a finger, an arm, a leg, a foot, a shoulder, etc. Alternatively, the object may be distinct from the operator, such as a pen, pointer, paddle, mirror, or the like. Such a distinct object may be grasped by an operator, connected to any suitable portion of the operator's body, or may be coupled to the marking assembly. In some embodiments, object 70 may be slidable along a track that extends parallel to the light beam, and may be manually placed in the light beam while coupled to the track.

In the example of FIG. 3, object 70 is positioned above the proximal end 69 of defect 68, at a feature location 20 slightly proximal to defect 68. Interrupted, shortened optical path 74 is measured by detector 44 and communicated to controller 24. Similarly, distal end 80 of defect 68 may be marked by positioning object 70, as shown in FIG. 4, at a point along a default optical path 26 corresponding to distal end 80, to produce shortened optical path 78.

A feature location corresponding to distal end 56 of wood product 16 may be marked with object 70, as previously described, or by temporarily lowering optical measuring device 18, or by slightly lifting distal end 56 of material 16 above bracket 64 so that material 16 alters optical path 26. The feature location at distal end 56 also may be communicated to controller 24 through keypad 86 (see FIG. 1) by inputting a total overall value the dimension of the material as measured along processing axis 22.

Each optical path 26, 74, 78 may include an angle of reflection 0 at which light beam 46 is reflected back to detector 44. In some embodiments, a maximum angle of reflection θ at each feature location may be less than about 30°, less than about 20°, or less than about 10°.

A typical session for marking material 16 may be initiated with a signal to controller 24 that the user has material 16 properly positioned on brackets 64. The signal may be initiated by an input either through keypad 86, a switch, such as foot pedal 88, or by deflecting light beam 46, among others. Controller 24 then may recognize and interpret data sent by optical measuring device 18 according to any suitable logical sequence. For example, the user may use object 70 to mark proximal end 66 and distal end 56 of material 16 first, followed by internal feature locations 20 of one or more defects 68. Alternatively, the user may mark all features 20 in linear order, including one or both end positions of material 16. Controller 24 then interprets internal feature locations 20 as flanking a defect 68. Marking station 12 also may include an audible and/or visible signal mechanism, such as a bell, buzzer, or light, that informs the user when a feature location along processing dimension 22 has been measured and sent to controller 24. For example, light post 89 may be provided to give visible signals corresponding to data input events such as material marking, based on light beam deflection.

Once all feature locations 20 have been communicated to controller 24, the user may move second material 16 to processing station 28, for example, after processing of previously processed first material 30 (see FIG. 1). Alternatively, a processing station may be located linearly downstream from marking station 14, so that second material 16 may be moved parallel to its processing axis to place the second material in the processing station 28. After second material 16 is moved from the marking station 14, or while it is still in the marking station, the controller may be signaled that a third material is to be marked. The third material may be placed in the marking station and marked by light beam deflection. Processing of first material 30 and marking of second material 16 may be controlled concurrently by controller 24, for example, by signaling the controller with foot switch 88. This signal may activate both positioner assembly 29 and optical marking device 18. Alternatively, marking assembly 12 may be disposed such that material 16 may be marked and processed without moving the material to a distinct processing station.

In the system shown in FIG. 1, positioner assembly 29 uses positioner 106 to push first material 30 along processing line 108. Positioner 106 is any structure that determines the position of material 30 along processing line 108. Examples of positioner 106 include a pusher, a fence, or a stop block or any other similar structure configured to move or index material. Typically, the user places material 30 in processing station 28, on infeed table 110, so that processing axis 34 of material 30 is parallel with processing line 108 of positioner 106, by abutment with guide rail 112. Positioner 106 moves parallel to processing line 108 to contact distal end 114 of wood product 30. Positioner 106 positions proximal end 116 of wood product 30 an appropriate distance beyond saw 32 based on a positioning signal sent from controller 24 to a motor in housing 118. The motor controls movement of positioner 106 through slider 120 in positioner assembly 29. Slider 120 is displaced along guide rail 112 in response to controller 24 instructions to the motor. Alternatively, instead of a pushing-type positioner to move material 30 to the saw, the saw may be automatically moved along the processing line to an appropriate location for cutting according to marked features. In another design, a roll feeder may be used to move the material.

After positioner 106 has automatically positioned wood product 30 appropriately, saw 32 is activated to process wood product 30. This may be carried out automatically, for example, by controller 24 moving saw 32, or manually, by the user moving saw 32. In an alternative configuration, movement of material 30 relative to modifying device 32 may be achieved also by moving device 32 parallel to processing axis 34, while material 30 is kept stationary. It should be noted that the marking station 12 may be useful with any automated processing system in which materials to be processed include features 68 that vary in location between the materials along processing axis 22.

After material 30 is cut, it may continue downstream onto outfeed table 121. Drop-box hole 121a may be provided in outfeed table 121 to allow waste pieces to fall into a waste receptacle.

Figure 5:
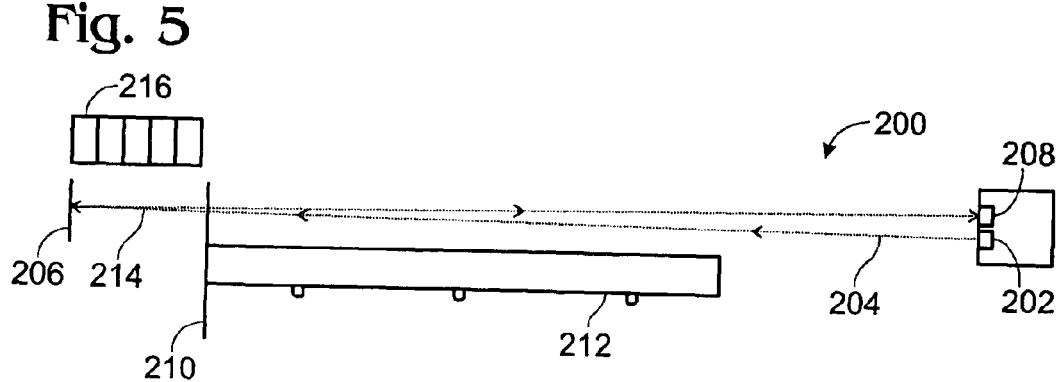
FIG. 5 is a schematic side elevation view of a marking system according to another embodiment of the invention.

FIG. 5 shows a marking system 200 according to an alternate embodiment of the invention. Light source 202 directs light beam 204 to reflector 206 where the beam is reflected to detector 208. Bumper 210 maintains material 212, at a fixed location relative to fixed light beam 204. Portion 214 of light beam 204 between bumper 210 and reflector 206 can be used to create signals by interrupting beam portion 214. The signals may be interpreted by a computer, for example, as processing instructions, separate from marking steps on material 212. This design enables many possible functions and adaptations to system 200. For example, a virtual keyboard 216 may be created. A template or similar device may be positioned near beam portion 214 so that operator may point to or touch different locations on the template, thereby causing interruptions of beam 204 at different locations. This feature of the invention may be used to input processing data or instructions that are related to, or distinct from, structural aspects of the material to be processed. For example, such data or instructions may signal the beginning or ending of a structural data input, initiation of material handling steps, start and/or stop instructions, the grade of material being processed, processing instructions relative to marks that have been or will be indicated on the material, etc.

Figure 6:
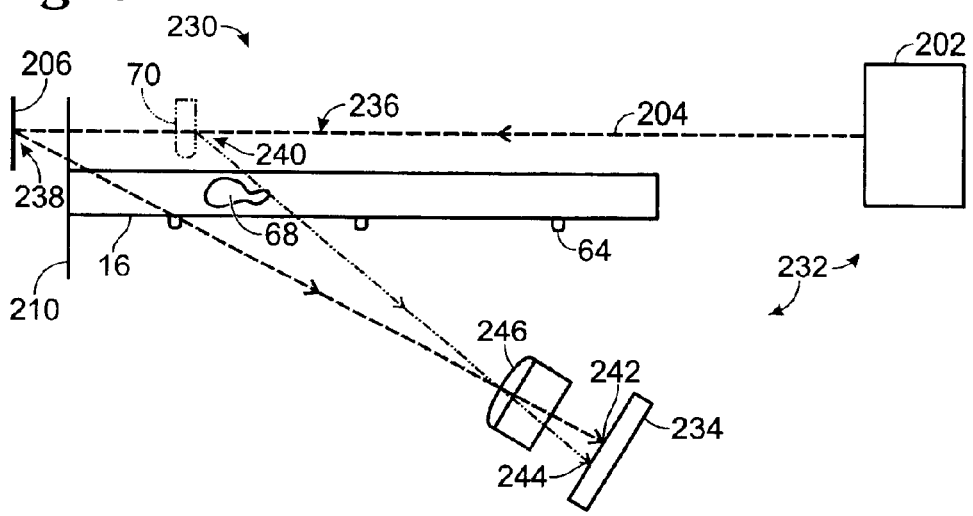
FIG. 6 is a schematic view of a marking system according to yet another embodiment of the invention.

FIG. 6 shows a marking system 230 that measures distances based on triangulation. Marking system 230 may be included in any suitable automated processing system. Marking system 230 may include an optical measuring device 232 having a light source 202 and a detector 234. The light source may send a beam of light 204 along a data input line 236 to a point of reflection, shown at 238 and 240. The point of reflection may be provided by default reflector 206 or by an object 70 placed in the light beam at a selected position along the data input line. Default reflector 206 or object 70 may reflect only a portion of light beam 204 to detector 234, shown at 242 or 244, such as by diffuse reflection.

The angle defined by the reflected light beam may be measured by detector 234, to provide a measure of the point of reflection along the data input line. Suitable optics, such as a lens 246, may be disposed between the point of reflection and the detector to focus light beam portions 242, 244 onto detector 234. The position at which each light beam portion is detected by detector 234 may be used to calculate the point of reflection by triangulation. For example, light beam portion 242 forms a smaller angle with data input line 236 than light beam portion 244. Accordingly, each of these angles may be related to a point of reflection and thus a distance/position along the data input line.

The data input line is any line segment in which an object may be placed in the light beam to input data for material processing or system operation to the controller. The data input line may have any suitable relationship to the light source and detection mechanism. The data input line may be substantially or completely formed by air. The data input line may be at least substantially parallel to the long axis of material 16 and/or parallel to an axis along which the material is to be processed, generally at one or more discrete positions. The data input line may extend from the light source to a default reflector 206. Alternatively, the data input line may be configured to be a subset of the line or line segment along which the light beam travels. For example, positions on this line or segment of travel that are too close or too far from the light source may not be recognized for data input. In some embodiments, optical elements, such as lenses or mirrors may be employed between the light source and the data input line to direct the light beam along the data input line.

Figure 7:
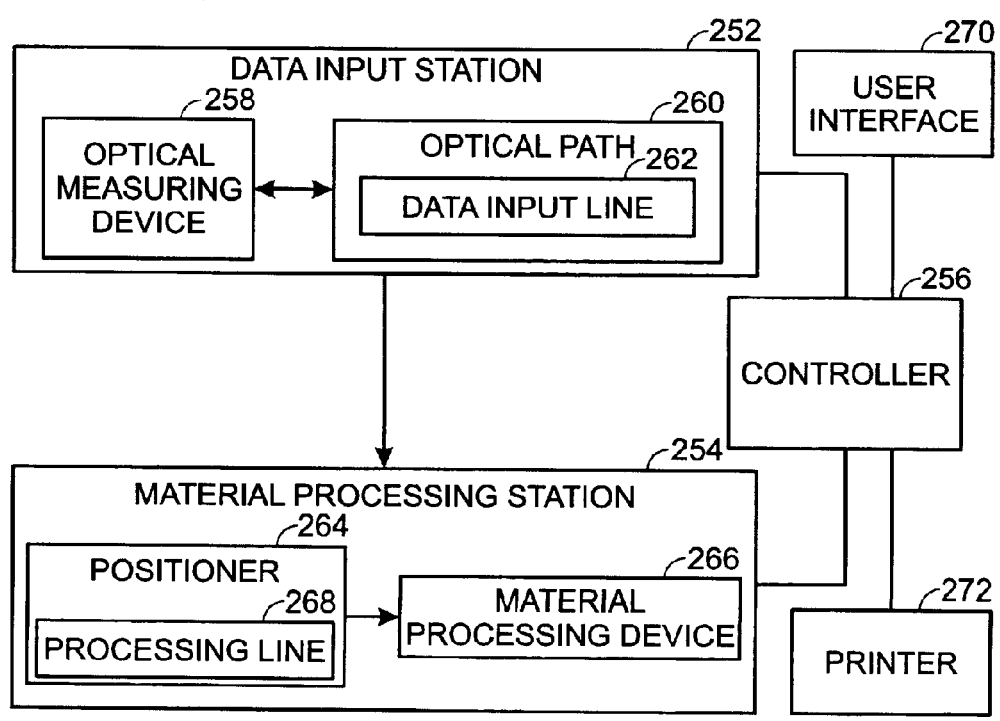
FIG. 7 is a schematic view of an automated material processing system, in accordance with an embodiment of the invention.

FIG. 7 shows a schematic view of a system 250 for automated material processing. System 250 may include a data input station 252, a material processing station 254, and a controller 256, among others.

Data input station 252 may be any mechanism for inputting data to system 250 by manual deflection of a light beam. A particular position at which the light beam is deflected may input data that corresponds to the particular position. The data may relate to operation of the system, processing a material, etc. The data input station may include an optical measuring device 258 that provides a light beam. The data input station also may define a default optical path 260 followed by the light beam. A portion of optical path 260 may provide a data input line along which the light beam travels. The optical measuring device may be configured so that placement of an object in the light beam at a particular position along the data input line inputs data to controller 256.

Material processing station 254 may be any mechanism for processing a material of interest. Station 254 may include a positioner 264 and a material processing device 266 that provide in-line processing along a processing line 268. The positioner may be configured to move parallel to a processing line 268, so that a material moves toward the material processing device to select discrete positions of the material, arrayed parallel to the processing line, at which the material is processed. Alternatively, or in addition, the material processing device may be configured to move to discrete positions of the material arrayed in parallel to processing line 268.

The material processing station may have any suitable spatial relationship to the data input station. For example, these stations may be overlapping, so that the material can be processed directly after the data is input. Alternatively, these stations may be spaced, so that the material is moved to the processing station after data input. For example, these stations may be at least substantially parallel, that is, data input line 262 may at least substantially or completely be parallel to processing line 268. The data input station may be disposed in front of, or behind, the material processing station, when viewed from a normal position of operation by a user. Accordingly, a material may be transferred, manually or automatically, from the data input station to the material processing station by movement perpendicular to the data input line and/or processing line. In some embodiments, the data input line and the processing line of such stations may be spaced so that a person's arms can transfer the material from the data input station to the material processing station while the person's feet are stationary, or spaced by a distance of less than about four feet. In some embodiments, the data input and material processing stations may be arrayed lengthwise, so that the stations are disposed on the left and right of each other in relation to a user in a normal position of use. Accordingly, the data input line and the material processing line may be substantially collinear. The material processing station may be disposed so that the material is moved substantially parallel to the data input line to position the material in the material processing station.

Controller 256 may be any device configured to manipulate data. Accordingly, the controller may be a digital processor or other computing device. The controller may be operatively connected to optical measuring device 258 and material processing station 254, particularly positioner 266 and/or material processing device 268. Accordingly, the controller may be configured to receive data input by a user through the optical measuring device. In addition, the controller may be configured to control operation of the positioner and/or material processing device, such as their movement, based on the data.

Controller 256 may be configured to operate data input and material processing stations concurrently, that is, during overlapping time intervals. Controller 256 may send and receive signals from the stations at slightly different times, but overall the data input and processing operations on two articles may be conducted at the same time. Accordingly, the data input station may input data to the controller about a second article or workpiece, while the material processing device is processing a first article, based on data previously input to the data input station. In some embodiments, the controller may be configured to store input processing data for two or more articles. The material processing station may be configured to sequentially process the two or more articles based on the input processing data.

System 250 may include a user interface 270 to provide a mechanism in addition to data input station 252 for inputting data to controller 256. User interface 270 may include a keypad, a keyboard, a touchscreen, a touchpad, a mouse, a foot-operated pedal, a voice recognition system, and/or the like.

Processing system 250 may be equipped with a printer 272, as shown in FIGS. 1 and 7. The printer may be operated manually or automatically depending on the application.

The printer may be configured to print hard copy output related to operation of the processing system. For example, when the processing system includes a saw, the controller for the saw may be configured so that yield data is automatically printed out at the end of executing a cut list. In some embodiments, the printout may summarize: (1) linear feet cut, (2) percentage of usable material, (3) percentage of waste material, and/or (4) total cutting time, among others. In some embodiments, the printer may be configured to print labels. The labels may include any suitable printed information or indicia, such as stop movements, piece counts, cut lengths, materials, part numbers, job names, and/or other kinds of information. The information can be printed to labels of various sizes, depending on the source of the data and parameters in the calibration/menu. The labels may be configured to be applied manually by a user of the system, or automatically when the material is processed.

Many different processing variations of the invention may be used. For example, the system may be programmed to record marks sequentially in a single direction, so that if a mark is made in or behind an area that was already marked, then the computer deletes all data up to that point allowing for correction and remarking of the area.

The system may also be programmed to manage handling of material not conforming to a cut list.

Figure 8:
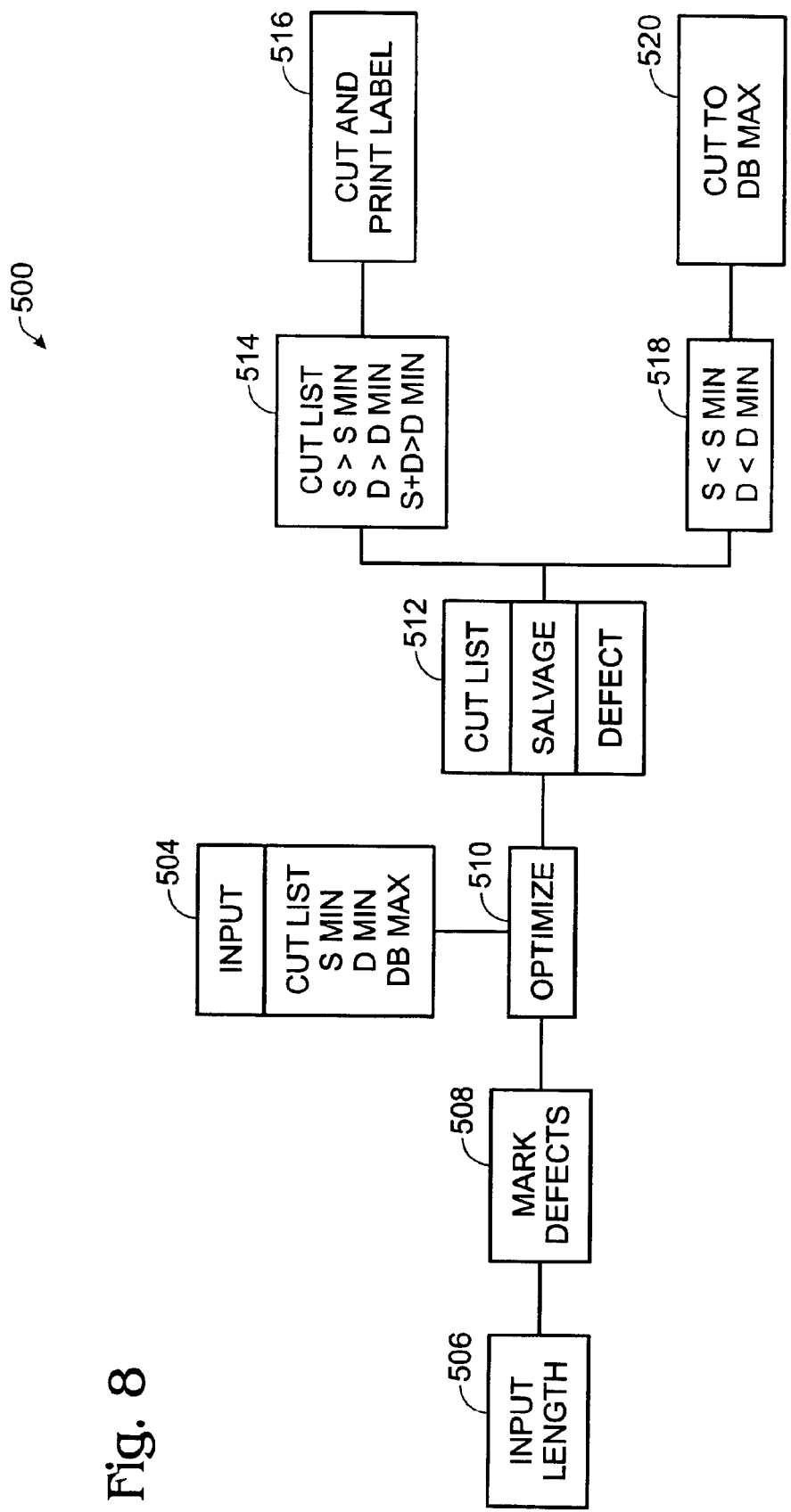
FIG. 8 shows a flow chart illustrating a method of salvaging material.

FIG. 8 shows a flow chart including steps used to salvage material. A computer is used in conjunction with an automated saw system such as one of the ones described above. The computer may be programmed to optimize cutting of stock material to satisfy a cut list, and may also be programmed to manage use or disposal of remainder material.

Generally, there may be two types of remainder material. One type is referred to as "salvage". Salvage materials are pieces that do not satisfy cut list requirements and do not contain marked defects. For example, if two five foot pieces are cut from an eleven foot board pursuant to a cut list, the remaining one foot piece (not required by the cut list) is considered salvage material. A second type of remainder material is referred to as "defect". Defect materials are pieces that contain defects such as knots or blemishes, particularly defects that have been actually or virtually marked by the operator.

In the system and method illustrated in FIG. 8, a computer is programmed to optimize and manage salvage or saving of remainder material. In system 500, the first step 504 involves inputting one or more cut lists, a minimum salvage length (Smin), a minimum defect length (Dmin), and a maximum drop box length (DBmax). Next, pieces of stock or raw material are processed according to the following routine.

In step 506 the length of a piece of material is input into the computer. The length may be measured and input manually by the operator. Alternatively, the length may be automatically measured and entered by positioning one or more sensors along the processing path. The computer may also be programmed to automatically assume end-cuts of a predetermined dimension will be made prior to figuring the best strategy or plan for cutting the material.

In step 508 the operator marks the location of defects. Marking may be carried out by actually marking and scanning the material. Alternatively, the preferred approach is to input location(s) of defects by "virtually marking" the defects using a light reflection or interruption technique, for example, such as the methods described above involving use of a light beam substantially parallel to the processing path.

In steps 510 and 512 the computer determines how to cut the material considering optimum use of material to satisfy the cut list(s), and how to manage remainder material, i.e., salvage and defect materials.

In steps 514 and 516 cut list pieces, salvage pieces having a length equal to or greater than Smin, defect pieces having a length equal to or greater than Dmin, and adjacent segments of salvage and defect pieces having a combined length equal to or greater than Dmin are cut, labeled, and saved for future use.

In steps 518 and 520 salvage pieces having a length less than Smin, and defect pieces having a length less than Dmin, are cut to lengths equal to or less than DBmax, and discarded. A drop box may be provided with an opening dimensioned to allow disposal only of pieces having a length equal to or less than DBmax.

The controller may also be configured to automatically measure a piece of material prior to cutting. The saw system is equipped with one or more length sensors. A piece of material is placed in the processing line. A pusher shoves the material forward until it reaches the sensor. The controller calculates the length of the material according to the known position of the pusher at the time the sensor detected the end of the material. The controller then determines how best to cut the material based on the length determination and any defect information entered by the operator.

The invention may also be programmed for double ended processing. For example, the controller may be programmed to control processing of material between a saw and a drill press, as shown in FIGS. 9 and 10. In FIG. 9, automated pusher 600 is set up on table 601, and configured to push workpieces either in direction 602 towards upcut saw 604, or alternatively, in the direction of arrow 608 toward drill press 610. In the example shown in FIG. 9, each machine 604 and 610, has a dedicated controller 612 and 614, respectively, equipped with a keypad for controlling operation of pusher 600 when being used with the respective machine. Dedicated interlock devices 616 and 618 are provided to prevent operation of the machine when pusher 600 is in motion. FIG. 10 is the same as FIG. 9 except a single keypad controller in keypad 620 is used interchangeably with the two machines 604 and 610. Keypad 620 is shown in position for use with drill press 610. The keypad is also shown in dashed lines in position 620a where it would be used with saw 604. When pusher 600 is moving, the respective interlock disables activation of the tool. When pusher 600 reaches the target location, then the interlock re-enables the tool to operate and then counts the stroke against the cut list. The appropriate interlock may operate depending on which end of the positioner track is designated as the "zero end".

In another example of the invention, an automatic back-off feature is implemented. First, the pusher moves a piece of material to point A relative to a machine such as a saw. Before cutting the material, the pusher moves back a preset distance. Cutting is carried out. Then the pusher returns to point A before pushing the material to the next position. The back-off step prevents the pusher from shocking or bumping the material while it is being processed.

The specific embodiments disclosed and illustrated herein should not be considered as limiting the scope of the invention. Numerous variations are possible without falling outside the scope of the appended claims. For example, the invention may be implemented in numerous different machine configurations with varying levels of automation. The invention may also be used to process many different kinds of materials including, but not limited to, wood, wood composites, polymeric materials such as PVC, polystyrene, polypropylene, polyethylene, fiberglass, textiles, etc. In addition to cutting, the invention may be used to carry out other processing steps such as boring, punching, routing, mortising, sanding, drilling, shearing, bonding, sewing, heating, UV curing, painting or graphics application, etc. The subject matter of the invention includes all novel and nonobvious combinations and subcombinations of the various elements, features, functions, and/or properties disclosed herein.

We claim:

1. A method of cutting material comprising connecting a computer to a saw machine, the computer being programmed to optimize cutting of stock to satisfy a cut list, inputting into the computer: (a) a cut list, (b) a minimum salvage length (Smin), (c) a minimum defect length (Dmin), (d) a maximum drop box length (DBmax), inputting the length of a piece of material to be processed, inputting location of any defects in the piece of material, determining a cutting plan in which: (a) salvage pieces having a length less than Smin are cut to lengths of DBmax or less, and (b) defect pieces having a length less than Dmin are cut to lengths of DBmax or less; except if adjacent salvage and defect pieces have a combined length greater than Dmin then the adjacent pieces are not cut to DBmax or less regardless of their individual lengths.

2. The method of claim 1, further comprising cutting pieces according to the plan.

3. The method of claim 1, further comprising automatically printing labels for pieces cut for the cut list.

4. The method of claim 1, further comprising automatically printing labels for (a) pieces included in the cut list, (b) salvage pieces having a length equal to or greater than Smin, (c) defect pieces having a length equal to or greater than Dmin, and (d) adjacent salvage and defect pieces having a combined length greater than Dmin.

5. The method of claim 1, wherein the pieces cut to lengths of DB max or less are directed to a waste receptacle for destruction or chipping.

6. The method of claim 1, wherein the step of inputting location of any defects is performed without actually marking the material to be cut.

7. The method of claim 1, wherein the step of inputting location of any defects includes interrupting a light beam near a defect boundary.

8. The method of claim 7, wherein the step of inputting location of any defects includes interrupting a light beam at least twice indicating upstream and downstream sides of a defect.

9. A method of cutting material comprising providing a computer programmed to optimize cutting of stock to satisfy a cut list, connecting a computer to a saw machine, the computer being programmed to optimize cutting of stock to satisfy a cut list, inputting into the computer: (a) a cut list, (b) a minimum salvage length (Smin), and (c) a minimum defect length (Dmin), inputting the length of a piece of material to be processed, inputting location of any defects in the piece of material, determining a cutting plan in which: (a) salvage pieces having a length less than Smin are discarded, and (b) defect pieces having a length less than Dmin are discarded; except if adjacent salvage and defect pieces have a combined length greater than Dmin then the adjacent pieces are saved regardless of their individual lengths.

10. The method of claim 9 further comprising inputting a maximum drop box length (DBmax) into the computer, and cutting discarded pieces into lengths equal to or less than DBmax.

* * * * *